United States Patent [19]
Steinwandel et al.

[11] Patent Number: 5,876,486
[45] Date of Patent: *Mar. 2, 1999

[54] METHOD AND APPARATUS FOR REMOVING CARBON DIOXIDE

[75] Inventors: Juergen Steinwandel, Oberuhldingen; Walter Jehle, Horgenzell; Burkhard Wagner, Oberteuringen; Theodor Staneff, Bermatingen, all of Germany

[73] Assignee: Dornier GmbH, Friedrichshafen, Germany

[*] Notice: This patent issued on a continued prosecution application filed under 37 CFR 1.53(d), and is subject to the twenty year patent term provisions of 35 U.S.C. 154(a)(2).

[21] Appl. No.: 711,209

[22] Filed: Sep. 9, 1996

[30] Foreign Application Priority Data

Sep. 9, 1995 [DE] Germany .................. 195 33 407.8

[51] Int. Cl.$^6$ .................................. B01D 53/22
[52] U.S. Cl. .................. 95/44; 95/51; 96/5; 96/8
[58] Field of Search .................. 95/44, 51; 96/5, 96/8, 10

[56] References Cited

U.S. PATENT DOCUMENTS

| | | | |
|---|---|---|---|
| 3,335,545 | 8/1967 | Robb et al. | 95/44 |
| 3,369,343 | 2/1968 | Robb | 95/51 X |
| 3,396,510 | 8/1968 | Ward, III et al. | 95/44 |
| 3,447,286 | 6/1969 | Dounoucos | 95/44 |
| 3,624,983 | 12/1971 | Ward, III | 95/44 |
| 3,751,879 | 8/1973 | Allington | 96/5 |
| 4,750,918 | 6/1988 | Sirkar | 55/16 |
| 4,834,779 | 5/1989 | Paganessi et al. | 95/44 |
| 4,844,719 | 7/1989 | Toyomoto et al. | 96/8 X |
| 5,082,471 | 1/1992 | Athayde et al. | 95/51 |
| 5,135,547 | 8/1992 | Tsou et al. | 96/5 X |
| 5,236,474 | 8/1993 | Schofield et al. | 96/10 X |
| 5,281,254 | 1/1994 | Birbara et al. | 95/44 |
| 5,470,379 | 11/1995 | Garrett | 96/8 X |
| 5,525,144 | 6/1996 | Gollan | 96/8 |
| 5,580,452 | 12/1996 | Lin | 96/5 X |

FOREIGN PATENT DOCUMENTS

| | | | |
|---|---|---|---|
| 0 309 259 B1 | 3/1989 | European Pat. Off. | |
| 0514021 | 11/1992 | European Pat. Off. | 96/8 |

Primary Examiner—Robert Spitzer
Attorney, Agent, or Firm—Evenson, McKeown, Edwards & Lenahan, P.L.L.C.

[57] ABSTRACT

The invention relates to a method and to an apparatus for continuously removing metabolically produced carbon dioxide from respired air, such as the air found in life support systems or cabin circulating systems, using two sets of hollow fibers disposed in a flowing, carbon dioxide-selective liquid membrane. The carbon dioxide-containing respired air flows through the first set of hollow fibers and the second set of hollow fibers serves to carry away the permeate stream.

22 Claims, 5 Drawing Sheets

METHOD AND APPARATUS FOR REMOVING CARBON DIOXIDE

BACKGROUND AND SUMMARY OF THE INVENTION

The present invention relates to a method and an apparatus for removing carbon dioxide, useful for life support systems and cabin circulation systems.

The continuous removal of metabolically produced carbon dioxide in life support systems and cabin circulation systems is necessary in order to make quality breathable air available as required by humans. Because of physiological requirements, the carbon dioxide content of breathable air must not exceeded 0.5%. Residual oxygen content at such carbon dioxide concentrations is adequate for the respiration function; however, prolonged exposure to higher carbon dioxide concentrations leads to physiological disorders with, in some cases, a dramatic decrease in reactivity. Currently, the biochemical mode of action is largely not understood and cannot be explained solely by an oxygen deficiency.

Typical areas of application, where removal of carbon dioxide from the breathing air is essential, are primary systems with completely closed air circulation, such as in manned space flight systems and submarines used for military or civilian purposes. Furthermore, applications in the areas of civilian air travel and high-speed railroad systems (conventional and linear motor systems) can be identified, which envision cabin air circulation that is sealed to the extent of about 85%, in order to save energy for heating, cooling and preparing air.

In each case, such sealed systems require continuous removal of metabolically produced carbon dioxide.

Currently, completely closed circulation systems such as in the MIR space station and submarines, remove carbon dioxide with solid absorbers. An example of a solid absorber is the use of lithium hydroxide cartridges, in which the carbon dioxide is removed by the irreversible formation of lithium carbonate from the hydroxide. After the loading limit has been reached, the absorber must be exchanged. At the present time, lithium hydroxide systems cannot be regenerated.

Regenerating systems based on materials which selectively absorb carbon dioxide are known in the area of chemical process technology and are state of the art, for example pressure change adsorption, with zeolite absorbing materials as well as liquid phase absorption using organic nitrogen bases, such as ethanolamine, with thermal or pressure-change regeneration. The typical area of application of such processes is in large stationary installations. These technically established processes can not easily be transferred to mobile systems. Additionally, by their very nature, such systems are discontinuous processes and require extensive chemical engineering effort in order to develop a quasi-continuous process. Continuous gas removal processes which can be operated with justifiable process technology effort, require the use of membrane-supported methods.

It is necessary to distinguish between membrane-supported absorption/desorption (for example, as disclosed in TerMeulen et al., WO 94/01204) and a true gas permeation membrane separation process. The present invention relates to a true gas permeation membrane separation.

Classical membranes used in gas permeation are solution-diffusion membranes, with a dense, active separating layer of polymer materials. Materials and performance data disclosing permeability and selectivity of such membranes for the separation of carbon dioxide from air are disclosed in Jehle et al., "Concentration and Subsequent Methanation of Carbon Dioxide for Space and Environmental Applications", Carbon Dioxide Chemistry, Env. Issues, The Royal Soc. of Chem., Stockholm 1994, pages 261–269. As can be seen from this disclosure, the presently known polymer membranes cannot be used for mobile applications, which are of primary interest here, because of the anticipated volume and weight of the module.

An improvement, specifically in carbon dioxide transport properties, for gas permeation processes is possible through the use of liquid membrane systems with so-called "carrier effects". Such carrier liquid membranes are characterized by a substance which preferentially binds the material to be transported in a selective and reversible manner. This substance is added to a solvent, which for membrane systems is often water. As such, it is possible to increase the transport rate by several orders of magnitude in comparison to the material transport rate naturally existing for a particular solvent. The latter is determined by the physical solubility of a substance in a solvent as well as by the corresponding diffusion coefficient.

FIG. 1 diagrammatically shows the basic concept of a carrier-borne transport process in a liquid membrane. The essential distinguishing feature is the fact that the carrier molecule, as well as the carrier/carbon dioxide complex, are free to move in the solvent. However, directed carbon dioxide transport through the liquid membrane can only occur if the carrier/carbon dioxide complex can dissociate into the starting components on the permeate side of the boundary phase. This process is thermodynamically controlled according to the following equilibrium:

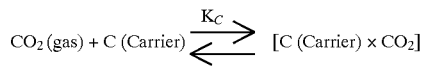

$$CO_2(gas) + C\,(Carrier) \underset{}{\overset{K_C}{\rightleftarrows}} [C\,(Carrier) \times CO_2]$$

$K_c$ is the reaction constant for the process. The equilibrium can be controlled exclusively by the partial pressure of the carbon dioxide. In each case, a resulting carbon dioxide flow through the membrane by carrier transport requires that the partial pressure of the carbon dioxide be lower in the gas space on the permeate side than in the gas space on the feed side. Therefore, high carbon dioxide concentrations favor formation of the carrier/carbon dioxide complex and low carbon dioxide concentrations favor the decomposition of the carrier/carbon dioxide complex.

The following measures are important for continuous gas permeation membrane processes:
i) Vacuum operation on the permeate side. The vacuum, produced by the vacuum pump, must be adapted so that at all times, the partial pressure of the carbon dioxide is lower on the permeate side than on the feed side.
ii) Flushing gas operation on the permeate side. The pressure level of the flushing gas is not important. Only the ratio of the volume flow of flushing gas to the volume flow of permeate gas under steady state operation is important. For the transport of carbon dioxide through the membrane, it is necessary that, as a result of the dilution effect of the flushing gas with respect to the carbon dioxide, the partial pressure of the carbon dioxide on the permeate side is less than the partial pressure of the carbon dioxide on the feed side.

It will be apparent that measures i) and ii) can also be used in combination (with no pressure level limitation for ii)).

FIG. 1 furthermore shows the basic, necessary arrangement of a liquid membrane, in this case, a liquid membrane based on water. The membrane liquid is between microporous, hydrophobic membranes, which usually consist of polymer materials, such as polytetrafluoroethylene (PTFE), polypropylene or polyvinylidenefluoride (PVDF).

At first, the gas exchange takes place without interference; liquid is prevented from emerging by the hydrophobic nature of the materials. If the liquid membrane is at rest, the system involves an immobilized liquid membrane. Methods for removing carbon dioxide with such membranes are disclosed in U.S. Pat. No. 4,750,918. Such methods involve continuously removing metabolically produced carbon dioxide from air, such as the air found in life support systems and cabin circulation systems, wherein the air containing metabolically produced carbon dioxide is passed through a first set of hollow fibers, which are embedded in a carbon dioxide-selective liquid membrane and the carbon dioxide-rich permeate is drawn off through a second set of hollow fibers, which are also disposed in the membrane. Solutions, consisting of potassium carbonate/potassium hydrogen carbonate with organic nitrogen bases such as monoethanolamine (MEA) and diethanolamine (DEA), are taught as selective carriers. The selective and reversible nature of the carbon dioxide bonding by organic nitrogen bases is established from gas-scrubbing methods (such as the activated MDEA method of BASF AG in Ludwigshafen, Germany).

A different possibility for constructing immobilized liquid membranes is to impregnate porous carrier structures (membranes) with an active removing liquid as disclosed in EP 0 309 259 B1.

The immobilized liquid membrane variations are clearly limited with respect to their commercial use for the removal of carbon dioxide with water-supported liquid membranes.

A problem not solved by such systems is that a constant loss of solvent (water) is noted due to the vacuum and/or flushing gas operation required on the permeate side of the system.

While moderate water losses from the liquid membrane do not interfere with the carrier transport mechanism, the water loss is much more serious with respect to the ability of the hydrophobic membranes to retain the removing liquid. Such processes involving membrane systems do not exhibit long-term stability unless water is supplied continuously.

A further disadvantage of such systems with immobilized liquid membranes is the fact that the separation capacity required for use in life support systems or cabin circulation systems leads to a relatively large exchange surface and thus to a large overall size of the separation system.

In addition to immobilized liquid membrane systems, flowing liquid membrane systems based on plate and frame modules for removing carbon dioxide are disclosed, for example in, Teramoto et al., Kakakukogaku Rombunshu 16, 6 (1990), Eido T., et al. Japanese Published Application No. HEI 2-246989 (1990), and Jehle, W., et al., SAE Technical Paper 941339 (1994). Teramoto and Jehle use experimental laboratory equipment to determine the relevant transport resistances. Solutions of potassium carbonate/potassium hydrogen carbonate with organic nitrogen bases (MEA, DEA) are used as selective membranes.

In the case of such plate and frame modules, there are significant problems with sealing the individual plates. This problem has yet to be solved for units with a larger number of plates, as required to be economically useful.

It is an object of the present invention to provide a method with high operating efficiency and good separating power for the removal of carbon dioxide from air in closed systems such as in life support and cabin circulation systems. This objective is accomplished by a method for continuously removing metabolically produced carbon dioxide from respired air, such as the air found in life support systems and cabin circulation systems, in which the carbon dioxide-containing respired air is passed through a first set of hollow fibers, which are embedded in a carbon dioxide-selective liquid membrane and the carbon dioxide-rich permeate is drawn off through a second set of hollow fibers, which are also disposed in the membrane, and in which the liquid membrane is circulated.

According to the present invention, two sets of hollow fibers are disposed in a circulating liquid membrane, which is selective for carbon dioxide. Carbon dioxide-containing respired air flows through a first set of hollow fibers and the carbon dioxide-rich permeate stream is discharged through a second set of hollow fibers.

Improved removal is achieved by virtue of the fact that a flowing liquid membrane is used. The carbon dioxide transport properties can be influenced further by varying the liquid flow conditions. Additionally, leakage problems, such as those known with the use of plate and frame modules, do not exist.

In a preferred embodiment, in order to facilitate the transport of material, each hollow fiber from the first set can be disposed adjacent to a hollow fiber from the second set.

In a preferred embodiment, a liquid membrane is used, which is based on aqueous, organic nitrogen bases. It may furthermore contain additions of potassium carbonate and/or potassium hydrogen carbonate. In another preferred embodiment, the liquid membrane is an aqueous solution of diethanolamine (DEA) at a concentration ranging from 0.1 to 2 moles/liter.

The concentration ratio of the individual components of the liquid membrane is preferably kept constant. In order to achieve this, individual losses are determined by a measurement and control mechanism, and appropriate amounts are added continuously.

A vacuum operation, a flushing gas operation or a combination of the two can be provided on the permeate side.

In a preferred embodiment, both sets of hollow fibers consist of identical, microporous, polymer material of a hydrophobic nature, for example, polytetrafluoroethylene, polyethylene or polypropylene.

According to the present invention, a technically usable method which exhibits long-term stability and high selectivity is created.

Other objects, advantages and novel features of the present invention will become apparent from the following detailed description of the invention when considered in conjunction with the accompanying drawings.

DETAILED DESCRIPTION OF PREFERRED EMBODIMENTS

Figure 1:
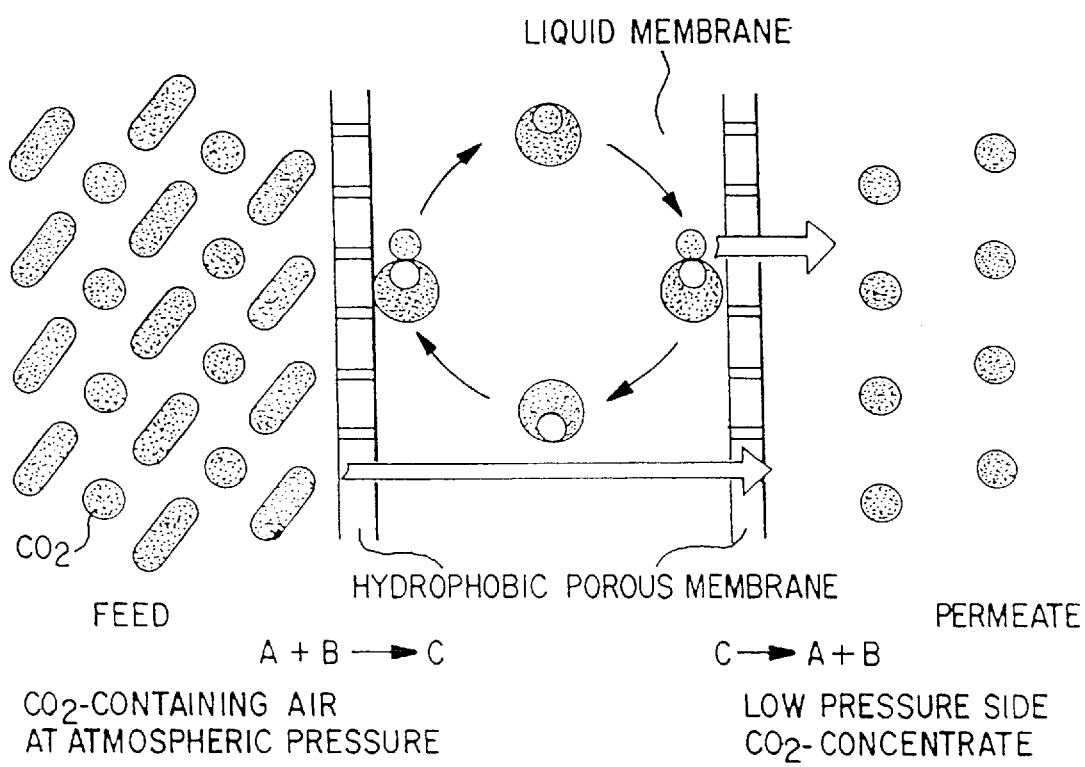
FIG. 1 is a diagrammatic view of a carbon dioxide carrier transport arrangement according to the prior art.
Figure 2A:
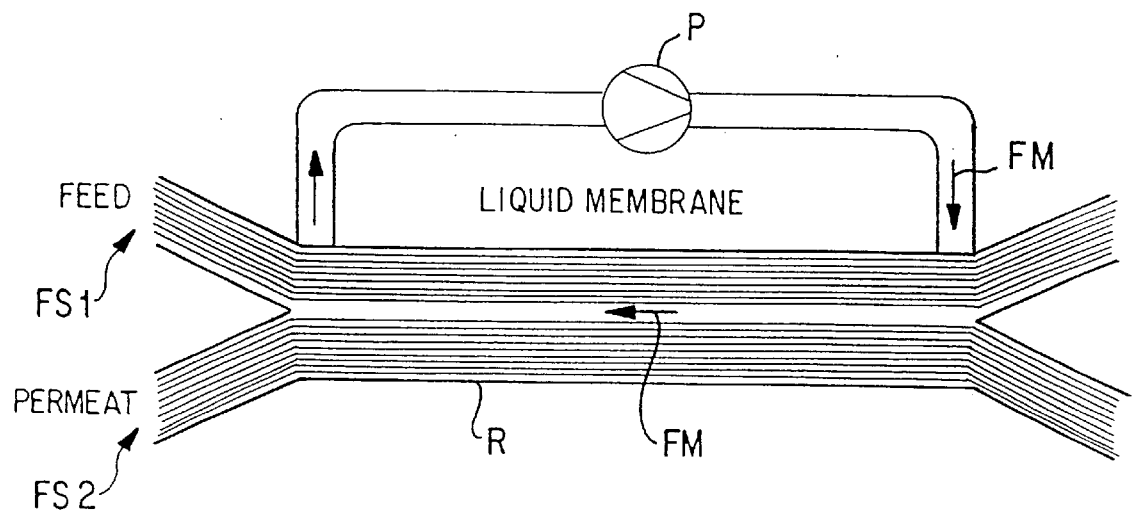
FIG. 2a is a longitudinal cross-section of a hollow fiber membrane module according to the present invention.
Figure 2B:
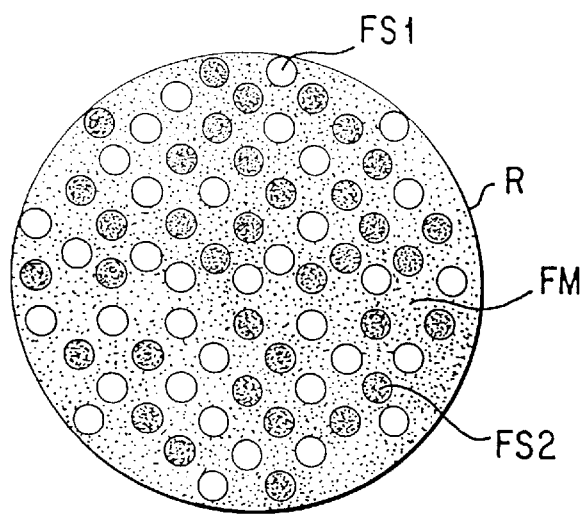
FIG. 2b is a transverse cross-section of a hollow fiber membrane module according to the present invention.

FIG. 2 shows a longitudinal cross-section (FIG. 2a) and a transverse cross-section (FIG. 2b) hollow fiber membrane module according to the present invention. The liquid membrane FM is in a modular pipe R constructed as the flow system. The two sets of hollow fibers FS1, FS2 are surrounded by the liquid membrane FM within the modular pipe R. The configuration corresponds to that of a bank of tubes of a heat exchanger. In the diagrammatic representation of FIG. 2a, every line within the modular pipe R corresponds to a fiber, the hollow fibers FS1 of the first set being disposed in the upper half of the modular pipe R and the fibers FS2 of the second set being disposed in the lower half of the modular pipe R. FIG. 2b shows a preferred arrangement of the fibers.

The carbon dioxide-laden respired air flows through the first set of hollow fibers FS1, also referred to as feed-side hollow fibers. The second set of hollow fibers FS2 serve to carry away the carbon dioxide-rich permeate, also referred to as permeate-side hollow fibers. The liquid membrane FM is circulated with the help of a pump P. Within the modular tube or pipe R, the liquid membrane flows essentially parallel to the axis of the hollow fibers. The arrangement of the hollow fibers within the modular pipe R can also be seen in FIG. 2b and is preferably arranged so that, in each case, a feed hollow fiber FS1 and a permeate hollow fiber FS2 are immediately one another.

Figure 3:
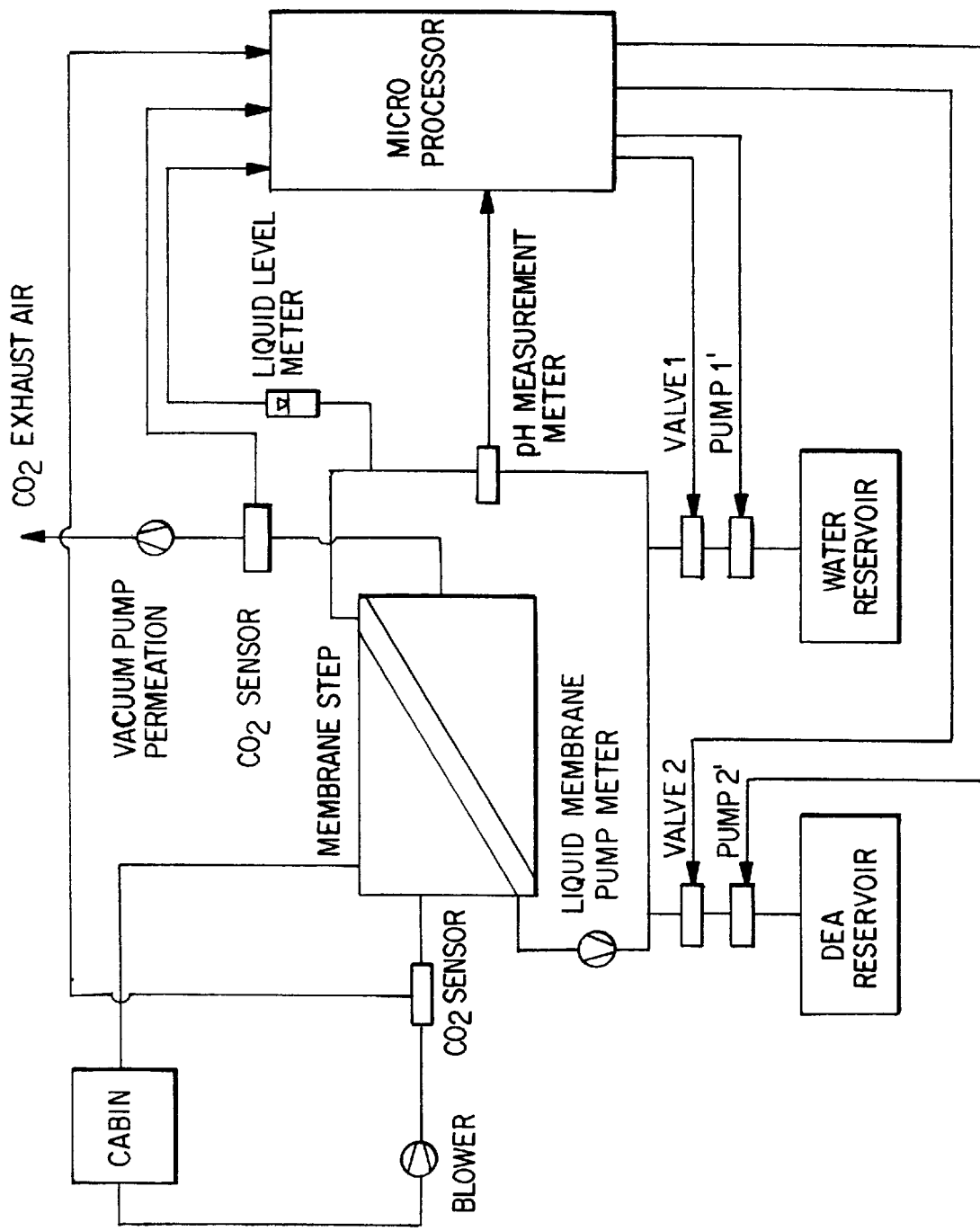
FIG. 3 is a flow diagram of the method according to the present invention with a vacuum operation on the permeate side.

FIG. 3 shows an arrangement of the overall method for the separation of carbon dioxide from respired air, such as in life support systems and cabin circulation systems, according to the present invention.

As can be seen from FIG. 3, the carbon dioxide-laden air is circulated from the cabin to the membrane step. The membrane step is indicated only diagrammatically as a black box; it corresponds essentially to the hollow fiber module shown in FIG. 2a. The carbon dioxide-laden cabin air flows through the first set of hollow fibers. Then the carbon dioxide passes through the carbon dioxide-selective liquid membrane into the second set of hollow fibers. The purified respired air in the first set of hollow fibers, after leaving the membrane step, is recirculated to the cabin.

The cabin air is circulated through the feed-side hollow fibers in the membrane step by using a blower. As a result, there is a maximum permissible pressure loss requirement on the membrane module feed side, which should range from 5 to 10 mbar. The pressure loss in the hollow fibers is determined by the cross section and the length of the hollow fibers, as well as by the nature of the gas flow (steady or turbulent). On the basis of experimental results, an operation under steady flow is preferred, as the total transport resistance is located in the region of the membrane liquid. In this respect, any decrease in the gas-side transport resistance due to turbulent flow is not helpful and results only in an increased pressure loss.

The practical arrangement of the liquid membrane circulation system is of particular advantage in terms of operational reliability. The first advantageous principle is that the chemical construction of the liquid membrane be as simple as possible. In this respect, a preferred embodiment involves the use of a liquid membrane consisting of water and diethanolamine at a concentration ranging from 0.1–2 moles/liter.

Such a simple chemical construction of the liquid membrane is particularly important when unavoidable losses of water as well as losses of the carrier DEA, which are far less but not negligible in permanent operation, are to be continuously compensated for.

In practice, the liquid membrane is circulated continuously with a pump. A level meter, which can recognize the loss of water in the circulating membrane by a lowering of the membrane liquid level, is integrated in the membrane circulation system. The level meter is basically a sensor unit. The digitized display values are supplied to a microprocessor, and when the liquid level falls below a specified threshold value, the microprocessor triggers the injection valve 1 and the liquid pump 1' of the water reservoir, and the membrane circulation system is supplied with an appropriate, calculated amount of water.

The same procedure is employed with respect to losses of the carrier DEA. However, greater efforts are required for measurement and control. Reliable identification of the instantaneous DEA concentration requires a continuous measurement of the pH in the liquid membrane. The instantaneous operating state of the membrane is also important. This can be determined by a comparative measurement of the absolute particle number densities of carbon dioxide in the feed and in the permeate. The displays of the two carbon dioxide sensors and the pH measurement are once again supplied in digitized form to the microprocessor, which controls the supply of DEA from the DEA reservoir via valve 2 and pump 2' in the manner described above for supplying water.

The permeate side of the membrane step is connected with a vacuum pump to provide permeate side vacuum operation, as described above.

Figure 4:
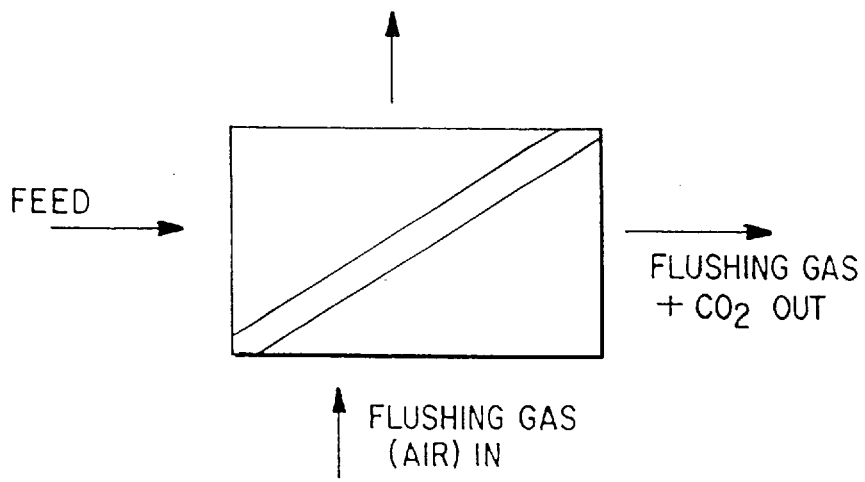
FIG. 4 is a schematic representation of the present invention with a flushing gas operation on the permeate side.
Figure 5:
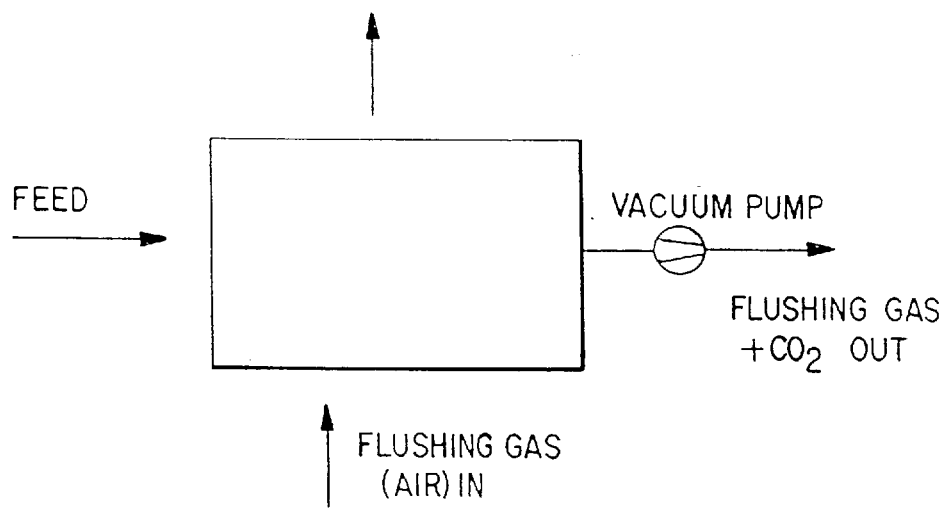
FIG. 5 is a schematic representation of the present invention with a combined flushing gas/vacuum operation on the permeate side.

FIGS. 4 and 5 diagrammatically illustrate two variations of the operation on the permeate side, the remainder of the construction being the same as that of FIG. 3. The permeate side of a flushing gas operation is shown in FIG. 4. A flushing gas, such as air, is fed to the hollow fibers on the permeate side. A combination of flushing gas operation and vacuum operation is shown in FIG. 5. Compared to FIG. 4, the hollow fibers on the permeate side are now also connected to a vacuum pump.

Figure 6:
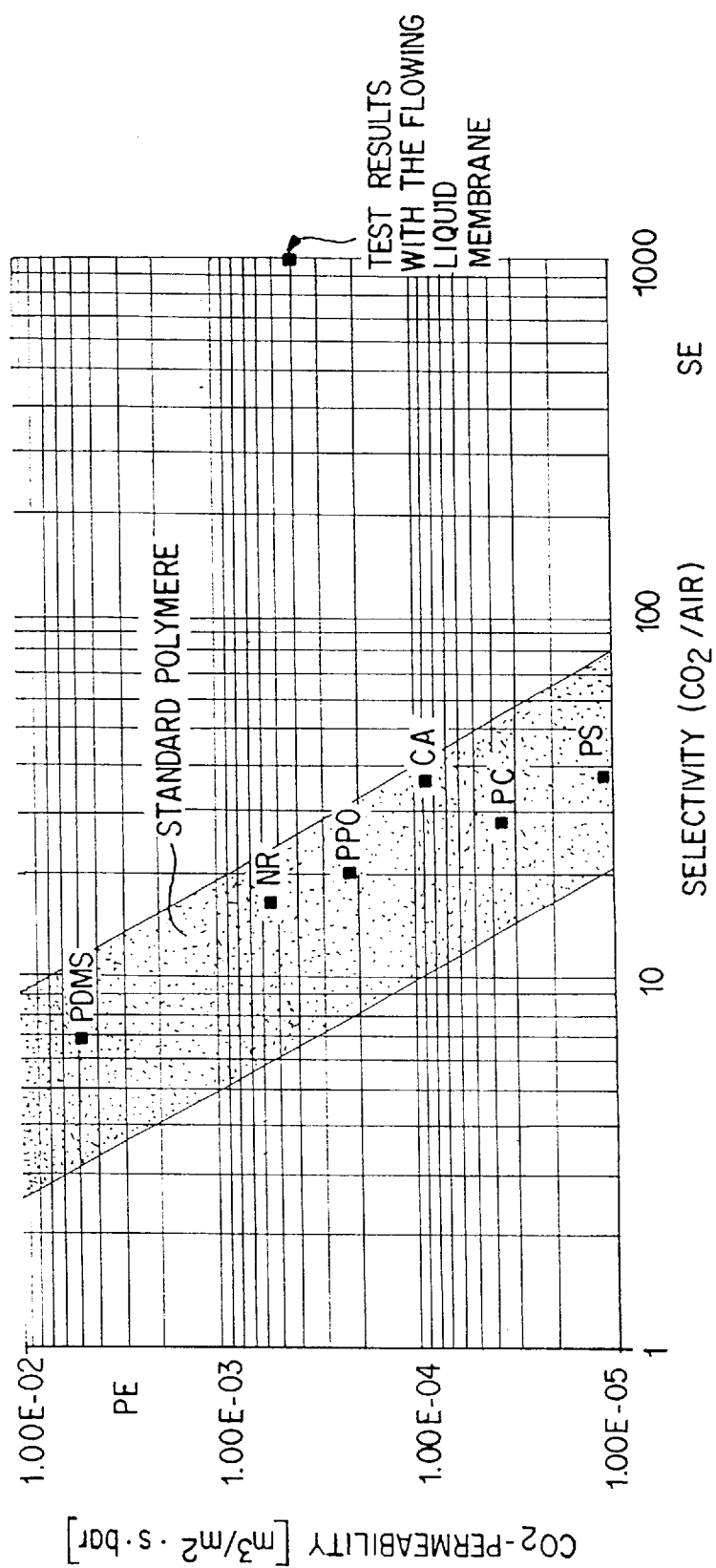
FIG. 6 is a diagram of measured carbon dioxide permeabilities under vacuum operation as a function of the difference between the carbon dioxide feed pressure and the carbon dioxide permeate pressure.

FIG. 6 is a diagram showing the carbon dioxide permeabilities when the permeate side is operated under a vacuum, as a function of the difference between the carbon dioxide feed pressure and the carbon dioxide permeate pressure (i.e. the selectivity). The results for some classical polymer materials, when the latter are used as solution diffusion membranes, are shown in the darkened area. As can be seen from the diagram, the polymer materials have different carbon dioxide permeabilities, however, the carbon dioxide/air selectivity for the application described here is not very high. As a comparison, an experiment using the inventive method was tested. In comparison to the known methods, high selectivity values were achieved with the present inventive method while, at the same time, the permeability values are acceptable.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for continuously removing carbon dioxide from respired air, comprising the steps of passing the carbon dioxide-containing respired air through a first set of hollow fibers which is disposed in a carbon dioxide-selective liquid membrane, and drawing off carbon dioxide-rich permeate from the first set of hollow fibers and passing said permeate through a second set of hollow fibers, which second set are also disposed in the membrane, wherein each hollow fiber from the second set is disposed adjacent to and neither encloses nor is enclosed by a hollow fiber from the first set, and continuously circulating the liquid membrane, wherein said circulating produces a movement of the liquid membrane around each hollow fiber.

2. The method of claim 1, wherein the liquid membrane is an aqueous solution of an organic nitrogen base.

3. The method of claim 1, wherein the liquid membrane comprises a solution of potassium carbonate or potassium hydrogen carbonate with an organic nitrogen base.

4. The method of claim 1, wherein the liquid membrane is an aqueous solution of diethanolamine (DEA).

5. The method of claim 1, wherein the liquid membrane is an aqueous solution of diethanolamine (DEA) at a concentration ranging from 0.1 to 2 moles/liter.

6. The method of claim 1, wherein the components of the liquid membrane have a mixing ratio which is kept constant during operation.

7. The method of claim 6, wherein at least one of the components of the liquid membrane is constantly replenished by a measurement and control mechanism.

8. The method of claim 1, wherein the hollow fibers of the second set are operated with a vacuum operation.

9. The method of claim 1, wherein the hollow fibers of the second set are operated with a flushing gas operation.

10. The method of claim 1, wherein the hollow fibers of the second set are operated with a combined vacuum and flushing gas operation.

11. The method of claim 1, wherein the respired air is air from a life support system or a cabin circulation system.

12. The method of claim 1, wherein said circulating produces a steady flow of said liquid membrane.

13. The method of claim 1, wherein said circulating occurs in a continuous loop with a pump.

14. An apparatus for continuously removing carbon dioxide from respired air, comprising:

a) a conduit system and a pump for continuously circulating a carbon dioxide-selective liquid membrane throughout the conduit system, b) a first set of hollow fibers disposed in the conduit system, the first set of hollow fibers having an interior which defines a feed side, c) a second set of hollow fibers disposed in the conduit side, the second set of hollow fibers having an interior which defines a permeate side wherein each hollow fiber from the first set is disposed adjacent to and neither encloses nor is enclosed by a hollow fiber from the second set, d) means for circulating carbon dioxide-containing respired air through the first set of hollow fibers, e) means for circulating permeate through the second set of hollow fibers, f) means for measuring and replenishing the liquid membrane, and g) means for maintaining a lower carbon dioxide partial pressure on the permeate side than on the feed side.

15. The apparatus of claim 14, wherein the means for measuring and replenishing the liquid membrane comprises a microprocessor and a sensor for measuring the level of the circulating liquid membrane.

16. The apparatus of claim 15, wherein the means for measuring and replenishing the liquid membrane comprises a sensor for measuring the carbon dioxide content in the carbon dioxide-rich respired air, a sensor for measuring the carbon dioxide content in the permeate and a sensor for measuring the pH of the liquid membrane.

17. The apparatus of claim 14, wherein both sets of hollow fibers consist of identical, microporous, hydrophobic polymeric material.

18. The apparatus of claim 14, wherein the hollow fibers are made from a polymer material selected from the group consisting of polytetrafluoroethylene, polyethylene and polypropylene.

19. The apparatus of claim 14, wherein the means for maintaining the carbon dioxide partial pressure comprises a vacuum pump.

20. The apparatus of claim 14, wherein the means for maintaining the carbon dioxide partial pressure comprises a flushing system.

21. The apparatus of claim 14, wherein the means for maintaining the carbon dioxide partial pressure comprises a combination of a vacuum pump and a flushing system.

22. The apparatus of claim 14, wherein said conduit system is in a continuous loop with a pump.

* * * * *